United States Patent [19]

Fink et al.

[11] 4,406,738
[45] Sep. 27, 1983

[54] USE OF AN ORGANOPOLYSILOXANE PREPARATION FOR THE TREATMENT OF PAPER FOR THE PRODUCTION OF PLASTER BOARDS

[75] Inventors: Hans-Ferdi Fink; Götz Koerner; Edmund Luksch, all of Essen, Fed. Rep. of Germany

[73] Assignee: Th. Goldschmidt AG, Essen, Fed. Rep. of Germany

[21] Appl. No.: 342,202

[22] Filed: Jan. 25, 1982

[30] Foreign Application Priority Data

Dec. 16, 1981 [DE] Fed. Rep. of Germany ....... 3149791

[51] Int. Cl.$^3$ .............................................. D21F 11/00
[52] U.S. Cl. .................................... 162/124; 156/41; 156/44; 162/135; 162/164.4; 162/184; 427/387; 427/391; 428/447; 428/448; 428/449; 428/452; 428/537; 428/703
[58] Field of Search ...................... 162/164.4, 135, 124, 162/184–186; 156/41, 44; 427/387, 391; 428/447, 448, 449, 452, 537, 703; 524/588

[56] References Cited

U.S. PATENT DOCUMENTS

| | | | |
|---|---|---|---|
| 3,389,042 | 6/1968 | Bieri et al. ......................... | 162/164.4 |
| 3,579,469 | 5/1971 | Grenoble ............................ | 524/588 |
| 4,204,030 | 5/1980 | Takamizawa et al. ............. | 162/164.4 |
| 4,258,102 | 3/1981 | Traver et al. ...................... | 428/448 |
| 4,366,286 | 12/1982 | Friemann et al. .................. | 524/588 |

FOREIGN PATENT DOCUMENTS 1529820  6/1968  France .

Primary Examiner—Peter Chin

Attorney, Agent, or Firm—Toren, McGeady and Stanger

[57] ABSTRACT

An organopolysiloxane suitable for use in treating paper to be used in plaster boards. The organopolysiloxane is obtained by reacting a polysiloxanol of the formula

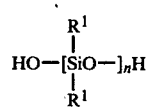

in which $R^1$ is a methyl or a phenyl radical, at least 90% of the $R^1$ radicals however being methyl radicals, and n=20 to 250, with a silane having the formula

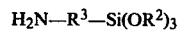

in which $R^2$ is a lower alkyl radical with 1 to 4 carbon atoms,
$R^3$ is a bivalent alkyl radical with 1 to 6 carbon atoms or the $-(CH_2)_xR^4(CH_2)_y-NH_2$ radical, in which $R^4$ is oxygen, sulfur or the $-NH-$ or $-NH-CH_2CH_2-NH-$ radical and
$x \leq 3$, and
$y \leq 2$, in such amounts that 1 SiOH group of the polysiloxanol corresponds to more than 1 and up to 3 $OR^2$ groups of the silane. Method for preparation of paper and cardboard for use in plaster boards as well as plaster boards made by using the present invention are disclosed.

16 Claims, No Drawings

USE OF AN ORGANOPOLYSILOXANE PREPARATION FOR THE TREATMENT OF PAPER FOR THE PRODUCTION OF PLASTER BOARDS

BACKGROUND OF THE INVENTION

1. Field of the Invention

This invention relates to the field of plaster boards used for building materials.

2. Description of the Prior Art

Plaster boards are used as sheeting for building materials and are covered on one side or on both sides, preferably however on both sides, with paper. These paper layers are firmly combined with the plaster core.

Such plaster boards usually are prepared by spreading on paper, generally having the thickness of cardboard, plaster paste in the amount required for the formation of the plaster board and then preferably covering the upper surface with a second paper (cardboard) layer. This multilayer material is then solidified at elevated temperatures and cut to the desired form before or after the final drying.

Since the paper used for covering the plaster paste generally has the thickness of cardboard, untreated paper can absorb considerable amounts of water from the plaster paste. As a result, the plaster paste within the outer layers becomes drier than that in the interior and crystallizes in a different manner. This phenomenon is termed streaking. The effect can proceed so far that the bond of the paper to the plaster core is weakened and that the layers delaminate. In order to solve this problem, proposals have been made wherein the absorptive capacity of the paper, i.e., cardboard, for water is reduced.

This approach and methods for treating paper with a curable, hydrophobic organosilicone are described in U.S. Pat. No. 3,389,042. This patent discloses the use of several known silicones, such as, for example, epoxyfunctional polysiloxanes, methylhydrogen siloxanes, silanes and siloxanes modified with isocyanate as well as alkoxysilanes and siloxanes prepared from these, as curable, hydrophobic, organosilicone compounds for the treatment of so-called plaster cardboards.

In U.S. Pat. No. 3,431,143, the addition of epoxyfunctional silicones to the paper during its manufacture is described. The paper thus treated is hydrophobized after the curing of the epoxyfunctional silicones.

In U.S. Pat. No. 4,258,102, silicone preparations are disclosed which consist of linear or branched polysiloxanols with a viscosity of 500 to 1,000,000 cP at 25° C. and certain amounts of colloidal silica. These preparations are applied to the paper after its manufacture and are then cured.

It is a common feature of all such known preparations that the organosilicone compounds used could only be cured in an economically short time by using a catalyst. However, the storage stability of the preparations was reduced by the presence of such catalysts. It was moreover necessary to match the paper and the organosilicone preparations in relation to the pH of the paper and the preparations, the salt content of the paper, and especially the aluminum sulfate content of the paper, so that the organosilicone compounds would neither precipitate nor gel, when the preparations are used.

SUMMARY OF THE INVENTION

We have discovered an aqueous preparation of organopolysiloxanes which adequately reduces the water absorption of the paper or cardboard used in the production of plaster boards, and cures without the use of special curing catalysts. In addition, the composition possesses a high stability even at normal use concentrations and remains unaffected by the pH of the paper. It also makes the use of special salts, such as, for example, aluminum sulfate, unnecessary in the paper manufacturing process, so that neutral papers can be produced with decreased water absorption capabilities.

The organopolysiloxane of the present invention is obtained by reacting a polysiloxanol having the formula

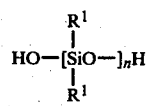
                                               I in which
$R^1$ is a methyl or a phenyl radical, at least 90% of the $R^1$ radicals being methyl radicals, and
n=20 to 250,
with a silane having the formula

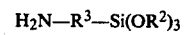
                                               II in which
$R^2$ is a lower alkyl radical with 1 to 4 carbon atoms,
$R^3$ is a bivalent alkyl radical with 1 to 6 carbon atoms or the $-(CH_2)_xR^4(CH_2)_y-NH_2$ radical, in which $R^4$ is oxygen, sulfur, $-NH-$, or $-NH-CH_2CH_2-NH-$ and
$x \geq 3$ and $y \geq 2$,
in amounts such that 1 SiOH group of the polysiloxanol corresponds to >1 to 3 $OR^2$ groups of the silane.

The composition of the present invention is prepared by adding a conventional emulsifier to an aqueous mixture of the above produced organopolysiloxane and to produce a stable, dilutable, highly concentrated emulsion.

DESCRIPTION OF THE PREFERRED EMBODIMENT

The compounds of formula I are essentially α,ω-dimethylsiloxanols, in which up to 10% of the $R^1$ radicals may be phenyl radicals. The average chain length of these compounds is given by the index n and amounts to 20 to 250 and, preferably, from 30 to 80, and most preferably from 50 to 70.

The silane of formula II is characterized by different reactive groups. It has three alkoxy radicals which are linked directly to the silicon atom, as well as an amino group, which is linked to the silicon atom via an $R^3$ bridge. In the reaction of the compounds of formula I with the silanes of formula II, the silanol groups of the polysiloxanol react with the alkoxy groups of the silane in proportion to the molar ratios and the degree of reaction.

As alkoxy groups, the silane contains those which have 1 to 4 carbon atoms. Preferably, the alkoxy groups are ethoxy groups.

The $R^3$ radical is a bivalent alkylene radical with 1 to 6 carbon atoms and an alkylene radical with 3 carbon atoms is preferred. Accordingly, an especially preferred silane of formula II is γ-aminopropyltriethoxy silane. Furthermore, aminomethyltripropoxy silane, γ- or δ-aminobutyltrimethoxy silane can be used.

$R^2$ can also represent the $-(CH_2)_x R^4 (CH_2)_y-NH_2$ radical, in which $R^4$ is oxygen, sulfur or the $-NH-$ or the $-NH-CH_2CH_2-NH-$ radical, the $-NH-$ radical being preferred. x is $\geq 3$ and preferably is 3, and y is $\geq 2$, and preferably 2.

The reaction of the polysiloxanol of formula I with the silane of formula II is accomplished in a known manner in amounts such that 1 SiOH group of the polysiloxanol corresponds to more than 1 to 3 alkoxy groups of the silane of formula II. The molar ratio of 1:2 is preferred. Reaction products of 1 mole of SiOH groups with 1 mole of alkoxy groups exhibit inferior properties in use.

The reaction can be carried out simply by mixing the two reaction partners, heating to temperatures of up to 180° C. with removal of the $R^2OH$ alcohol formed and then cooling. In the case of a reaction ratio of 2 to 3 SiOR groups per SiOH group, the $R^2OH$ alcohol is preferably distilled off completely. At an SiOR:SiOH ratio of less than 2, only a portion of the alcohol formed is distilled off in order to avoid possible gelling. For example, at an SiOR:SiOH ratio of greater than 1 to about 1.5, only 30% of the alcohol is distilled off.

An emulsifier is then added to the reaction product. Suitable emulsifiers include, for example, an addition product of 8 to 12 moles of ethylene oxide on dodecyl alcohol or an addition product of 8 to 14 moles of ethylene oxide on nonylphenol or mixtures thereof. The emulsifier is added to the reaction product in an amount of about 10%, based on the reaction product. The mixture is then emulsified in a known manner with water to produce a stable, dilutable, highly concentrated emulsion. The concentration of the stock emulsion should advisably be 30 to 60%. A concentration of 45% to 50% is preferred.

These emulsions can be stored practically indefinitely, the disperse phase neither separating from the emulsion nor curing to a detectable extent. This is surprising because of the gelling propensity of the aminosiloxanes on standing in air.

In use, the composition of the present invention is added to the paper during or after the production of the paper, especially, however, during the production of the paper.

If the diluted, aqueous preparation is added during the production of the paper, the addition takes place appropriately during the drying step, after the consolidated paper has already lost the bulk of the water.

If the cardboard is prepared by adding more pulp to the paper, which has already been partially dewatered, it may suffice to add the aqueous preparation of the organosilicon compound only to the layer of paper which, during later use, is in direct contact with the plaster paste. On being adder during the production of the paper, the above-described stock emulsion is diluted so that it contains about 1 to 10% of active substance, based on the aqueous phase. The absolute amount depends, inter alia, on the thickness of the paper, the absorptive capacity of the paper fibers and the running speed of the paper machine.

The preparation can also be coated onto finished paper. For this purpose, the stock solution as such or a slightly diluted stock solution is used and the preparation can be spread on the paper by a metered roller application or by using a doctor blade system. It is also possible to spray the diluted preparations on the paper.

The reaction product of the present invention is cured during and after the drying of the paper. The curing time depends on the temperature. At temperatures of ca. 150° C., curing is completed after about 15 minutes. On the other hand, if the treated paper is left at room temperature, curing progresses sufficiently after about three days, that the paper can be used for its intended purpose.

It is a particular advantage of the preparations of the present invention that it is possible to use them without the addition of any hardener, and especially, that papers can be used which are free of aluminum sulfate. These papers may be employed particularly advantageously in the production of plaster boards.

The preparation of the present invention is exceptionally effective. For hydrophobizing the paper, it is sufficient if 0.3 to 0.5 g of the cured silicon compound per square meter are present on the surface of the paper or in the paper. Papers, which have been treated with the inventive preparation, permit defect-free plaster boards to be produced without streaking and delaminations. The paper is not distorted on contact with the moist plaster paste. Rather, a plane surface is obtained or maintained.

The following example illustrates the present invention:

EXAMPLE

A mixture of 1,000 g (0.147 moles) of dihydroxydimethyl polysiloxane (molecular weight=6803) and 43.4 g (0.196 moles) of γ-aminopropyltriethoxysilane is heated with stirring and under nitrogen to 180° C. and kept at this temperature until 13.5 g of ethanol have been driven off. This process requires ca. 4 hours. The product formed is then cooled down.

This product (1,000 g) is mixed with 100 g of an emulsifier mixture of an ethoxylated triglyceride with an HLB of 18 and ethoxylated fatty alcohol polyglycol ether with an HLB of ca. 11 in a quantity ratio of 60:40 and made into an emulsifier with 900 g of water in an ultrasonic mixer.

This emulsion (400 g) is added to 20 kg of 3.5% starch solution and mixed in thoroughly. This liquor is now applied with a roller device on cardboard. In so doing, the cardboard undergoes a weight increase of 35.7 $g/m^2$ while moist. This corresponds to an amount of siloxane of 0.35 $g/m^2$. The treated cardboard is passed through a dryer, the cardboard is heated to 60° C., and then rolled up once again. After three days storage, hydrophobization has proceeded sufficiently so that the cardboard can be used for the production of plaster boards.

The water absorption is tested in the following manner. A plastic pipe, 100 mm in diameter is clamped perpendicularly onto a 12×12 cm weighed sheet of the cardboard to be tested, the treated side being up. Water (79 ml) is then poured into the pipe. After 50 seconds, the water is poured off, the pipe removed and the cardboard freed from adhering water by placing it between some sheets of filter paper, and weighed.

The increase in weight, multiplied by 10,000 and divided by 78.5, gives the water absorbed per square meter. Example:

weight of the sheet previously:     3.74 g

| -continued | |
|---|---|
| afterwards: | 3.89 g |
| water uptake: | 0.15 g |
| water uptake: = | 19.1 g/m² |

In the present example, the weight of the impregnated sheet is 3.74 g; after the water treatment, a weight of 3.89 g is obtained. From this, the water uptake is calculated to be 19.1 g/m².

Using the above-described impregnated cardboard, a plaster board is prepared according to the process of Example 1 of U.S. Pat. No. 3,389,042. The panel exhibits neither delamination nor streaking and the surfaces are plane.

We claim:

1. In a method for preparing papers for use in plaster board wherein pulp in aqueous dispersion is converted into a paper sheet by dewatering followed by drying, the improvement which comprises making the surface of the paper hydrophobic by adding to the paper dispersion during the drying step a composition comprising an aqueous emulsion of an organopolysiloxane formed from the reaction of a polysiloxanol having the formula

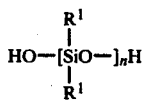

in which
R$^1$ is a methyl or a phenyl radical, at least 90% of the R$^1$ radicals however being methyl radicals, and
n=20 to 250,
with a silane having the formula

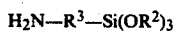

in which
R$^2$ is lower alkyl radical with 1 to 4 carbon atoms,
R$^3$ is a bivalent alkyl radical with 1 to 6 carbon atoms or the —(CH$_2$)$_x$R$^4$(CH$_2$)$_y$—NH$_2$ radical, in which R$^4$ is oxygen, sulfur or the —NH— or —NH—CH$_2$CH$_2$—NH— radical and
x≧3, and
y≧2,
in such amounts that 1 SiOH group of the polysiloxanol corresponds to more than 1 and up to 3 OR$^2$ groups of the silane and an emulsifier and then allowing the composition to cure.

2. The method of claim 1 wherein the emulsion contains from about 1 to 10 percent by weight of the organopolysiloxane.

3. The method of claim 1 wherein the emulsifier is an addition product of 8 to 12 moles of ethylene oxide on dodecyl alcohol, an addition product of 8 to 14 moles of ethylene oxide on nonylphenol, or mixture thereof.

4. The method of claim 1 or 2 wherein the amount of emulsifier is about 10 percent by weight based on the amount of organopolysiloxane.

5. The method of claim 1 or 2 wherein the concentration of the organopolysiloxane in the emulsion is from about 30 to 60 percent by weight.

6. The method of claim 4 wherein the concentration of the organopolysiloxane is from 45 to 50 percent.

7. In a method for preparing paper for use in plaster board wherein pulp in aqueous dispersion is converted into a paper sheet by dewatering and then drying the dewatered sheet, the improvement which comprises partially dewatering the dispersion to produce a paper layer and, prior to drying, adding additional pulp dispersion to the partially dewatered sheet, said additional dispersion containing a composition comprising an aqueous emulsion of an organopolysiloxane formed from the reaction of a polysiloxanol having the formula

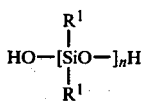

in which
R$^1$ is a methyl or a phenyl radical, at least 90% of the R$^1$ radicals however being methyl radicals, and
n=20 to 250,
with a silane having the formula

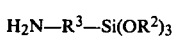

in which
R$^2$ is a lower alkyl radical with 1 to 4 carbon atoms,
R$^3$ is a bivalent alkyl radical with 1 to 6 carbon atoms or the —(CH$_2$)$_x$R$^4$(CH$_2$)$_y$—NH$_2$ radical, in which R$^4$ is oxygen, sulfur or the —NH— or —NH—CH$_2$CH$_2$—NH— radical and
x≧3, and
y≧2,
in such amounts that 1 SiOH group of the polysiloxanol corresponds to more than 1 and up to 3 OR$^2$ groups of the silane and an emulsifier and then allowing the composition to cure.

8. The method of claim 7 wherein the emulsion contains from about 1 to 10 percent by weight of the organopolysiloxane.

9. The method of claim 7 or 8 wherein the emulsifier is an addition product of 8 to 12 moles of ethylene oxide on dodecyl alcohol, and addition product of 8 to 14 moles of ethylene oxide on nonylphenol, or mixture thereof.

10. The method of claim 7 or 8 wherein the amount of emulsifier is about 10 percent by weight based on the amount of the amount of organopolysiloxane.

11. The method of claim 7 or 8 wherein the concentration of the organopolysiloxane in the emulsion is from about 30 to 60 percent by weight.

12. The method of claim 11 wherein the concentration of the organopolysiloxane is from 45 to 50 percent.

13. A method for making the surface of a sheet of paper or cardboard hydrophobic comprising applying to the surface of the sheet a coating of a composition comprising an aqueous emulsion of an organopolysiloxane formed from the reaction of a polysiloxanol having the formula

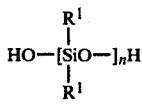

in which
R$^1$ is a methyl or a phenyl radical, at least 90% of the R$^1$ radicals however being methyl radicals, and
n=20 to 250, with a silane having the formula $$H_2N-R^3-Si(OR^2)_3$$

in which
R$^2$ is a lower alkyl radical with 1 to 4 carbon atoms,
R$^3$ is a bivalent alkyl radical with 1 to 6 carbon atoms or the $-(CH_2)_xR^4(CH_2)_y-NH_2$ radical, in which R$^4$ is oxygen, sulfur or the $-NH-$ or $-NH-CH_2CH_2-NH-$ radical and
$x \geq 3$, and
$y \geq 2$,
in such amounts that 1 SiOH group of the polysiloxanol corresponds to more than 1 and up to 3 OR$^2$ groups of the silane and an emulsifier and then allowing the composition to cure.

14. A paper or cardboard sheet produced by the method of claim 1, 2, 3, 6, 7, 8, or 13.

15. In a method for making plaster board wherein a layer of plaster paste is spread onto a first sheet of paper or cardboard, the layer is covered with a second sheet of paper or cardboard and the laminate is then solidified at elevated temperatures, the improvements which comprises using as the first and second sheets the sheet of claim 14.

16. Plaster board produced by the method of claim 15.

* * * * *